United States Patent
Lan et al.

(10) Patent No.: US 11,096,165 B2
(45) Date of Patent: Aug. 17, 2021

(54) METHODS FOR INTER-SYSTEM CARRIER AGGREGATION IN ADVANCED WIRELESS COMMUNICATION SYSTEMS

(71) Applicant: NEC CORPORATION, Tokyo (JP)

(72) Inventors: Yuanrong Lan, Victoria (AU); Kevin Lin, Victoria (AU); Phong Nguyen, Victoria (AU)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/854,146

(22) Filed: Apr. 21, 2020

(65) Prior Publication Data
US 2020/0252918 A1    Aug. 6, 2020

Related U.S. Application Data

(63) Continuation of application No. 15/889,365, filed on Feb. 6, 2018, now Pat. No. 10,645,684, which is a
(Continued)

(30) Foreign Application Priority Data

Dec. 19, 2013 (AU) .............................. 2013904975

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1861* (2013.01); *H04L 5/001* (2013.01);
(Continued)

(58) Field of Classification Search
CPC .... H04W 72/042; H04W 88/02; H04L 5/001; H04L 5/1469; H04L 5/0055; H04L 1/1861
See application file for complete search history.

(56) References Cited

U.S. PATENT DOCUMENTS

| 8,891,466 B2 | 11/2014 | Hsieh et al. |
| 10,433,296 B2 | 10/2019 | Takeda et al. |

(Continued)

FOREIGN PATENT DOCUMENTS

| CN | 101784076 B | 11/2012 |
| JP | 2015-165605 A | 9/2015 |

(Continued)

OTHER PUBLICATIONS

Communication dated Oct. 15, 2019, from the Japanese Patent Office in counterpart Application No. 2018-239238.
(Continued)

*Primary Examiner* — Kiet Tang
(74) *Attorney, Agent, or Firm* — Sughrue Mion, PLLC

(57) ABSTRACT

There is provided a signaling method for use in an advanced wireless communication network (100) that supports a first duplex mode, a second duplex mode different to the first duplex mode, and carrier aggregation of the first second duplex modes. This method includes configuring a UE (104-106) for data communication with the network (100) through a first access node (101) as a PCell, on the first duplex mode and with a first transmission mode (TM) including one or more transport blocks (TBs). This method also includes configuring the UE (104-106) for data communication with the network (100) through a second access node (103) as a SCell, on the second duplex mode and with a second TM including one or more TBs. The second TM associated with the second access node (103) is configured independently of the first TM associated with the first access node (101).

3 Claims, 4 Drawing Sheets

Related U.S. Application Data continuation of application No. 14/773,856, filed as application No. PCT/JP2014/083813 on Dec. 16, 2014, now Pat. No. 9,924,506.

(51) Int. Cl.
  *H04L 5/00* (2006.01)
  *H04L 5/14* (2006.01)
  *H04W 88/02* (2009.01)

(52) U.S. Cl.
  CPC .......... *H04L 5/0055* (2013.01); *H04L 5/1469* (2013.01); *H04W 88/02* (2013.01)

(56) References Cited

U.S. PATENT DOCUMENTS

| | | | |
|---|---|---|---|
| 2011/0096693 | A1 | 4/2011 | Astely et al. |
| 2013/0083742 | A1 | 4/2013 | Baldemair et al. |
| 2013/0208689 | A1 | 8/2013 | Kim et al. |
| 2013/0308550 | A1 | 11/2013 | Yin et al. |
| 2014/0086174 | A1 | 3/2014 | Nam et al. |
| 2014/0092865 | A1* | 4/2014 | Heo .................. H04W 28/0221 370/331 |
| 2015/0236834 | A1 | 8/2015 | Seo et al. |

FOREIGN PATENT DOCUMENTS

| | | |
|---|---|---|
| WO | 2013/051983 A1 | 4/2013 |
| WO | 2015-065111 A1 | 5/2015 |

OTHER PUBLICATIONS

Communication dated Jul. 31, 2019 issued by the Indian Intellectual Property Office in counterpart application No. 5422/CHENP/2015.
3GPP IS 36.213 V11.4.0, Technical Specification Group Radio Access Network; Evolved Universal Terrestrial Radio Access (E-UTRA); Physical Layer Procedures (Release 11), Sep. 2013, pp. 137-148.
3GPP TSG RAN WG1 Meeting #75, R1-135355, ZTE, "Issues for TDD-FDD CA," San Francisco, USA, Nov. 11-15, 2013, pp. 1-8.
Extended European Search Report issued in corresponding European Patent Application No. 14870964.5, dated Sep. 28, 2016, 9 pages.
International Search Report corresponding to PCT/JP2014/083813, dated Mar. 10, 2015 (2 pages).
LG Electronics "Considerations on HARQ-ACK and DCI for TDD-FDD CA", 3GPP TSG RAN WG1 Meeting #75, R1-135464, San Francisco, USA, Nov. 11-15, 2013, 7 pages.
Written Opinion corresponding to PCT/JP2014/083813, dated Mar. 10, 2015 (3 pages).
Communication dated Nov. 10, 2020 from the Japanese Patent Office in Application No. 2019-203789.
Panasonic, "PUCCH resource allocation for carrier aggregation for EPDCCH", 3GPP TSG-RAN WG1 Meeting #71, R1-125078, New Orleans, USA Nov. 12-16, 2012, 3 pages.
Ericsson, "HARQ feedback and PUCCH design for TDD-FDD CA", 3GPP TSG RAN WG1 Meeting #75, R1-135649, San Francisco, USA, Nov. 11-15, 2013, 4 pages.
LG Electronics et al., "Correction on HARQ-ACK procedure", 3GPP TSG-RAN WG1 Meeting #66bis, R1-113608, Zhuhai, China, Oct. 10-14, 2011, 13 pages.

* cited by examiner

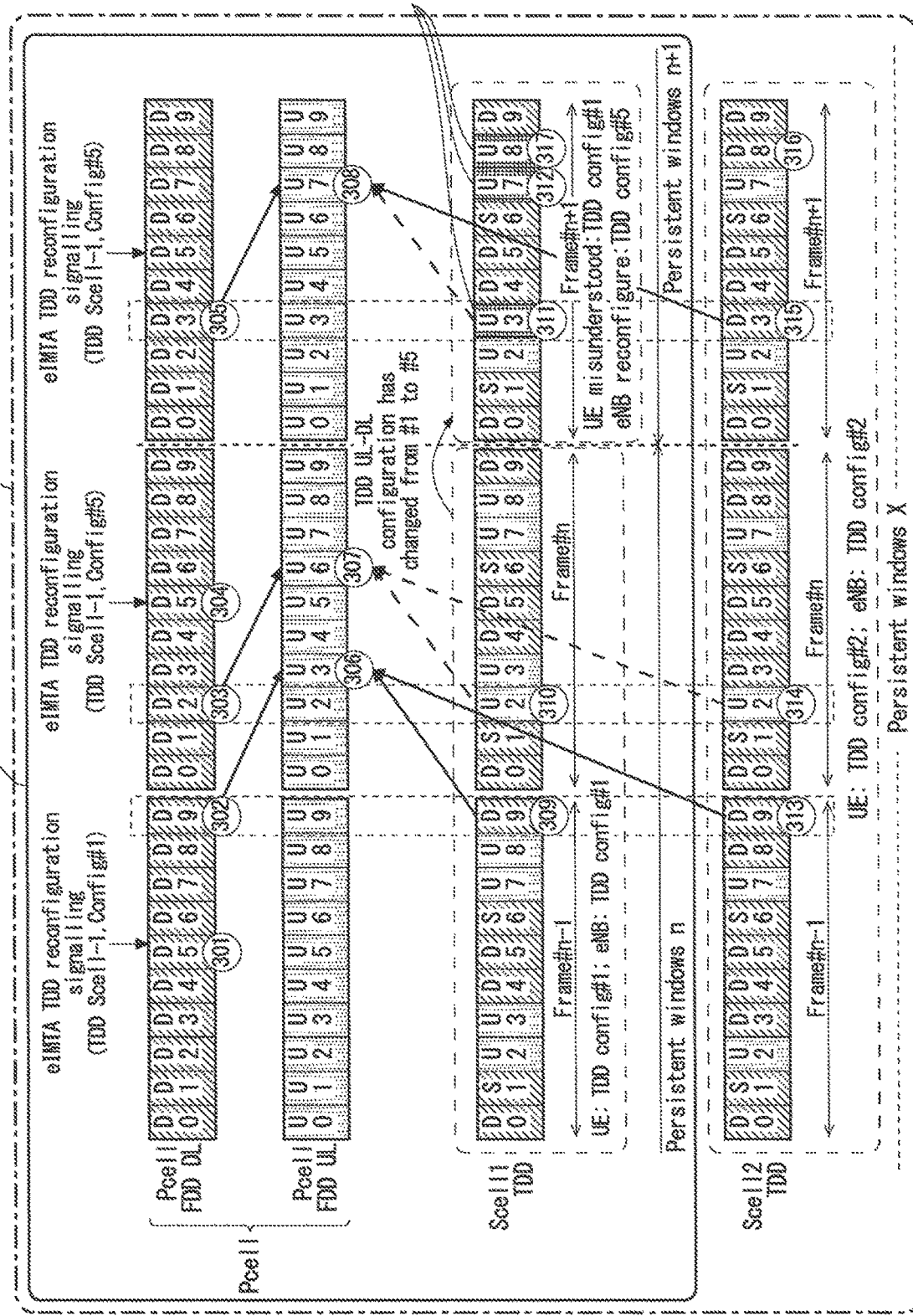

METHODS FOR INTER-SYSTEM CARRIER AGGREGATION IN ADVANCED WIRELESS COMMUNICATION SYSTEMS

CROSS REFERENCE TO RELATED APPLICATIONS

This is a Continuation of U.S. patent application Ser. No. 15/889,365, filed Feb. 6, 2018, which is a Continuation of U.S. patent application Ser. No. 14/773,856, filed Sep. 9, 2015 (allowed), which is a National Stage of International Application No. PCT/JP2014/083813 filed Dec. 16, 2014, claiming priority based on Australian Patent Application No. 2013-904975 filed Dec. 19, 2013, the contents of all of which are incorporated herein by reference in their entirety.

TECHNICAL FIELD

The present invention relates to control signaling in advanced wireless communication networks.
<Abbreviations>
The following abbreviations are used herein:

| | |
|---|---|
| 3GPP | third generation partnership project |
| ACK | Acknowledgement |
| CA | carrier aggregation |
| DAI | Downlink Assignment Index |
| DCI | Downlink Control Information |
| DL | Downlink |
| eIMTA | Enhanced interference management and traffic adaptation |
| eNB | Evolved Node B |
| FDD | frequency division duplex |
| H-ARQ or HARQ | hybrid automatic repeat request |
| H-ARQ ACK | hybrid automatic repeat request acknowledgment |
| LTE | long term evolution |
| NACK | negative acknowledgement |
| (E)PDCCH | (enhanced) physical downlink control channel |
| PCell | primary component carrier |
| PDCCH | physical downlink control channel |
| PDSCH | physical downlink shared channel |
| PUCCH | physical uplink control channel |
| PUSCH | physical uplink shared channel |
| RRC | radio resource control |
| Rel. | Release (e.g. LTE Rel. 11 means LTE Release 11) |
| SCell | secondary component carrier |
| TDD | time division duplex |
| TB | transport block |
| TPC | transmit power control |
| UE | user equipment |
| UL | uplink |
| UL-SCH | uplink shared channel |
| UMTS | Universal Mobile Telecommunications System |

BACKGROUND ART

3GPP Evolved UMTS Terrestrial Radio Access (E-UTRA) supports both FDD (full duplex) and TDD (half duplex) duplex modes. The behaviour of terminals simultaneously connected using different duplex modes has, however, not been specified. For network operators with both FDD and TDD spectrum, mechanisms that enable simultaneous use of both FDD and TDD spectrum resources, and thus allow both spectrum resources to be well (preferably fully) utilized, are desirable. As such, efficient TDD and FDD spectrum usage, and utilization of different technologies jointly, are expected to become more important for future LTE deployments in order to accommodate increased throughput and capacity needs.

The use of carrier aggregation (CA) offers a means for increasing peak data rates and throughput by aggregating multiple carrier components, as was discovered during 3GPP Release 10 LTE development, and enhanced during 3GPP Rel. 11 LTE CA enhancement work. It is expected that future LTE FDD-TDD CA deployment scenarios may allow either TDD or FDD cells to be used as a PCell and therefore, support for generic LTE FDD-TDD CA is desirable.

SUMMARY OF INVENTION

Technical Problem

Several problems exist, however, in supporting generic LTE FDD-TDD CA. For example, in prior art 3GPP LTE Rel. 10-11 CA systems, the PCell is always the serving cell with the best channel quality. As such, no configuration exists to enable an SCell to utilise two TBs and the PCell only one TB. Furthermore, no efficient Hybrid Automatic Repeat reQuest (HARQ) timing for FDD-TDD CA operation exists.

Certain systems of the prior art specify that when FDD is configured as the PCell and TDD is configured as the SCell, PDSCH HARQ timing of the TDD SCell shall follow PDSCH HARQ timing of FDD PCell. However, if Downlink (DL) HARQ timing of the TDD SCell follows DL HARQ timing of the FDD PCell, it is unclear how to efficiently and reliably provide HARQ-Acknowledgment (HARQ-ACK) messages from different serving cells. A problem with HARQ-ACK in such case is that the UE and the eNB may not have a common understanding of the mapping between PDSCH/PDCCH/EPDCCH transmission and the related HARQ-ACK. The problem is exaggerated when there are multiple TDD SCells having different UL-DL configurations and a reconfiguration occurs.

Furthermore when a SCell is configured with eIMTA, the reconfiguration period could be as short as 10 ms. In such case, ambiguity between eNB and UE in terms of adopted TDD configuration can happen frequently. In particular, when a UE fails to detect the eIMTA reconfiguration signaling, there could be more than one radio frames where the UE and the eNB may have different understandings in terms of the PDSCH HARQ-ACK, which can in turn cause unnecessary retransmission for some PDSCH/PDCCH/EPDCCH data, or a lack of scheduling retransmission for certain PDSCH/PDCCH/EPDCCH data which is required by the UE.

It will be clearly understood that, if a prior art publication is referred to herein, this reference does not constitute an admission that the publication forms part of the common general knowledge in the art in Australia or in any other country.

Solution to Problem

The present invention is directed to control signaling in advanced wireless communication networks, which may at least partially overcome at least one of the abovementioned disadvantages or provide the consumer with a useful or commercial choice.

With the foregoing in view, the present invention in one form, resides broadly in a signaling method for use in an advanced wireless communication network that supports a first duplex mode, a second duplex mode that is different to the first duplex mode, and carrier aggregation of the first duplex mode and the second duplex mode, the method including:

configuring a user equipment for data communication with the advanced wireless communication network through a first access node as a primary component carrier (PCell), on the first duplex mode and with a transmission mode (TM) including one or more transport blocks (TBs); and configuring the user equipment for data communication with the advanced wireless communication network through a second access node as a secondary component carrier (SCell), on the second duplex mode and with a transmission mode (TM) having one or more transport blocks (TBs);

wherein the TM associated with the second access node is configured independently of the TM associated with the first access node.

According to certain embodiments, the first duplex mode may be frequency division duplex (FDD) and the second duplex mode may be time division duplex (TDD). Furthermore, in some embodiments, the first access node is configured to operate at first paired carrier frequencies and the access node is configured to operate at a second unpaired carrier frequency.

According to some embodiments, the user equipment is configured for data communication with the network through the second access node with a greater number of TBs than the first access node. In particular, and according to certain embodiments, the user equipment is configured for data communication with the network through the first access node with one TB, and for data communication with the network through the second access node with two TBs.

According to certain embodiments, the method further includes generating an acknowledgment message, the acknowledgment message including a plurality of acknowledgment message identifiers, wherein each of the one or more TBs of the TM of the first access node and each of the one or more TBs of the TM of the second access node is associated with one of the acknowledgment message identifiers. For example, the acknowledgment message identifiers may be bits of the acknowledgment message. The bits of the acknowledgment message can include a first subset of bits for PCell TBs and a second subset of bits for SCell TBs.

According to certain embodiments, the acknowledgment message identifiers may be bits of a Hybrid Automatic Repeat reQuest (HARQ)-acknowledgment (ACK) message. The bits of the HARQ-ACK message can be allocated according to the following table:

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary Cell | TB1 Secondary Cell | NA | NA |
| 3 | TB1 Serving Cell 1 | TB2 Serving Cell 1 | TB1 Serving Cell 2 | NA |
| 3* | TB1 Serving Cell 1 | TB1 Serving Cell 2 | TB2 Serving Cell 2 | NA |
| 4 | TB1 Primary Cell | TB2 Primary Cell | TB1 Secondary Cell | TB2 Secondary Cell |

According to certain embodiments, the first access node is a macro base station having a macro coverage area, and the second access node is a small base station having a small coverage area within the macro coverage area, and wherein the UE is located in the small coverage area when configured for data communication through the first access node and the second access node. In particular, the first access node can be configured to provide macro coverage; broadcast of system information; handling of mobility management; and control plane connectivity, and the second access node can be configured to provide small cell coverage and user plane connectivity for user data transmission and reception.

According to certain embodiments, the second access node is configured to flexibly allocate resources to the UE according to a presence of other UEs in a coverage area of the second access node.

In another form, the invention resides broadly in a signaling method for use in an advanced wireless communication network that supports a first duplex mode, a second duplex mode that is different to the first duplex mode, and carrier aggregation of the first duplex mode and the second duplex mode, the method including:

configuring a user equipment for data communication with the network through a first access node as a primary component carrier (PCell), on the first duplex mode and with a transmission mode (TM) including one or more transport blocks (TBs);

configuring the user equipment for data communication with the network through a second access node as a secondary component carrier (SCell), on the second duplex mode and with a transport mode (TM) including one or more transport blocks (TBs); and allocating acknowledgment message identifiers to the one or more TBs independent of a transmission direction of any components of the one or more TBs.

According to certain embodiments, the transmission direction includes one of an uplink (UL) transmission direction and a downlink (DL) transmission direction.

According to other embodiments, the first duplex mode may be frequency division duplex (FDD) and the second duplex mode may be time division duplex (TDD). The first access node can be configured to operate at a first carrier frequency and the access node can be configured to operate at a second carrier frequency.

According to certain embodiments, the acknowledgment message identifiers may be bits of an acknowledgment message. The acknowledgment message identifiers can be bits of a Hybrid Automatic Repeat reQuest (HARQ)-acknowledgment (ACK) message. Furthermore, the HARQ-ACK message can be multiplexed with data and transmitted on a PUSCH.

According to certain embodiments, the acknowledgment message identifiers are fed back according to one of: PUCCH format 1a/1b, PUCCH format 1b with channel selection; and PUCCH format 3.

According to an embodiment, the method further includes:

determining that the user equipment is able to support carrier aggregation of no more than two (2) serving cells; and feeding back the acknowledgment message identifiers according to 3GPP LTE PUCCH format 1a/1b.

According to another embodiment, the method further includes:

determining, for a subframe, that no downlink transmission (PDCCH/EPDCCH/PDSCH) occurs on the second access node for the subframe; and feeding back the acknowledgment message identifiers for the subframe according to 3GPP LTE PUCCH format 1a/1b.

According to yet another embodiment, the method further includes: receiving a TPC field data in a DCI format of a PDCCH/EPDCCH on the secondary access node; and allocating, according to the TPC field data, the acknowledgment message identifiers according to PUCCH format 3 for transmission on PUCCH resource.

A predefined value is associated with acknowledgment message identifiers of uplink (UL) subframes. The predefined value can be NACK.

Certain embodiments of the present invention provide a new mapping of transport block and serving cell to HARQ-ACK (j) for PUCCH format 1b HARQ-ACK channel selection which supports one transport block on PCell and two transport blocks on SCell.

Furthermore, certain embodiments provide a robust HARQ-ACK concatenation method for FDD-TDD CA system, which alleviates the impact caused by ambiguity in terms of the transmission direction on a subframe.

Certain embodiments provide a fall-back method for an FDD-TDD CA system with a FDD PCell and a single SCell configured with TDD.

Finally, certain embodiments of the present invention provide a method of generating HARQ-ACK identifiers with value of DTX or NACK/DTX for UL subframes, which enables a common understanding between the UE and the eNB (base station) in terms of the relationship between the PDSCH/PDCCH/EPDCCH and the HARQ-ACK.

Any of the features described herein can be combined in any combination with any one or more of the other features described herein within the scope of the invention.

The reference to any prior art in this specification is not, and should not be taken as an acknowledgment or any form of suggestion that the prior art forms part of the common general knowledge.

Advantageous Effects of Invention

According to the present invention, it is possible to at least partially overcome at least one of the abovementioned disadvantages or provide the consumer with a useful or commercial choice.

BRIEF DESCRIPTION OF DRAWINGS

FIG. 3 illustrates HARQ-ACK bit concatenation for an FDD-TDD CA system, according to an embodiment of the present invention.

DESCRIPTION OF EMBODIMENTS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of accompanying drawings.

Figure 1:
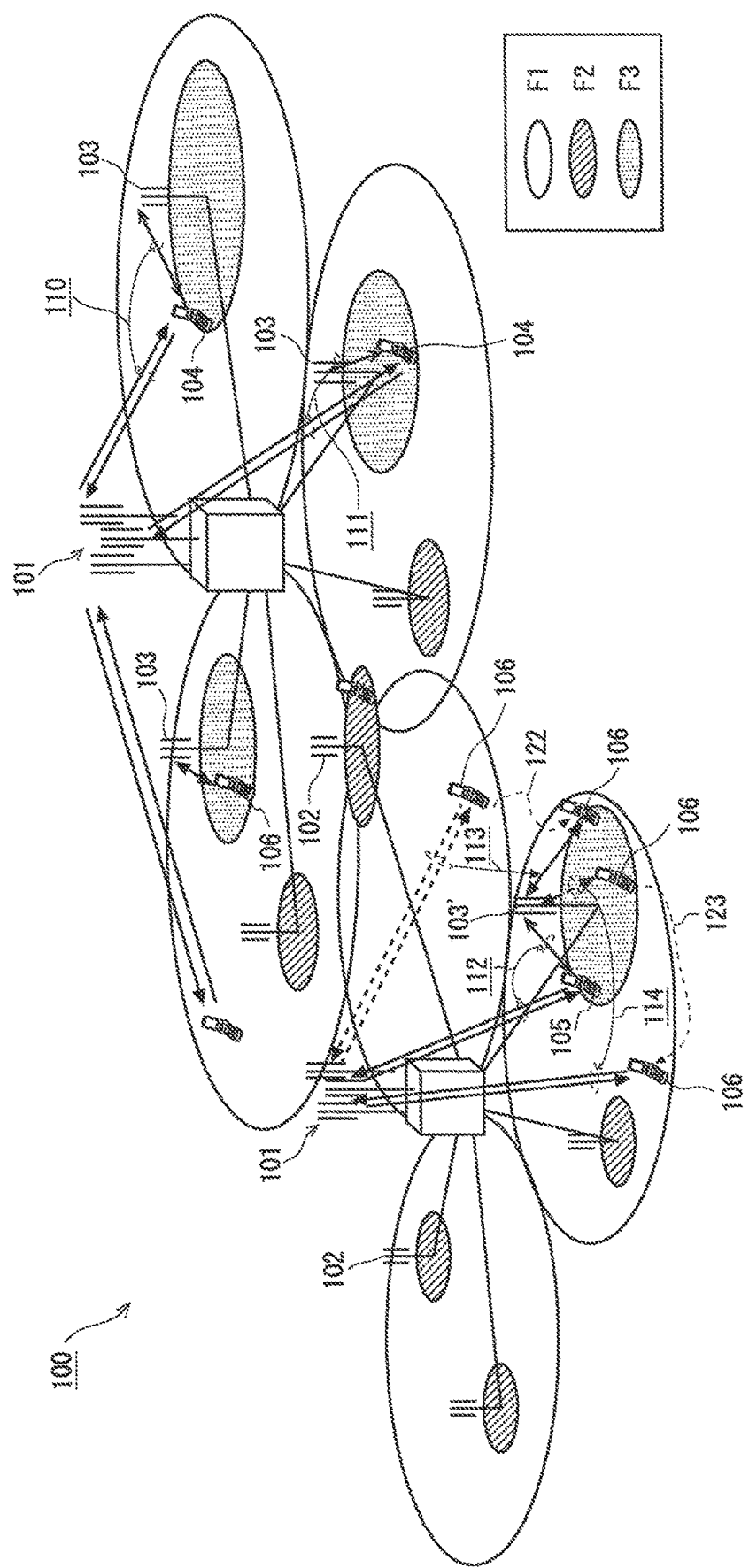
FIG. 1 illustrates an advanced wireless communication system, according to an embodiment of the present invention.

FIG. 1 illustrates an advanced wireless communication system 100, according to an embodiment of the present invention. The advanced wireless communication system 100 enables efficient FDD and TDD carrier aggregation.

The advanced wireless communication system 100 includes a plurality of FDD macro access nodes 101, representing macro base stations that can be configured to transmit and receive FDD signals on paired DL and UL carrier frequencies, and a plurality of FDD small cell access nodes 102, representing pico base stations that can be configured to transmit and receive FDD signals on paired DL and UL carrier frequencies. The advanced wireless communication system 100 further includes a plurality of TDD small cell access nodes 103 representing pico base stations that can be configured to transmit and receive DL and UL TDD signals on a single unpaired carrier frequency, and a plurality of advanced user equipments (UEs) 104, 105 and 106 that are capable of performing FDD signal transmission and reception, TDD signal transmission and reception, and FDD-TDD signal transmission and reception in the form of FDD-TDD Carrier Aggregation.

The FDD macro access nodes 101 serve macro-cells over a first paired carrier frequency F1, each macro-cell providing large coverage. The FDD small cell access nodes 102 serve small-cells over a second paired carrier frequency F2 and the TDD small cell access nodes 103 serve small-cells over a third unpaired carrier frequency F3.

The first carrier frequency F1 and the second carrier frequency F2 can be a same or different carrier frequency. Furthermore, a UL carrier frequency component of the first carrier frequency F1, and the third carrier frequency F3 can be a same or different carrier frequency.

The FDD macro access node 101 interconnects with the FDD small cell access nodes 102 and the TDD small cell access nodes 103 by a backhaul (not shown). According to certain embodiments of the present invention, the advanced wireless communication system 100 enables FDD-TDD carrier aggregation where an FDD carrier is the P Cell and TDD carrier(s) are the SCell, as illustrated by a first deployment scenario 110.

As such, the PCell may not be the serving cell with the best channel quality because a UE 104, 105 and 106 may be far from the FDD macro cell access nodes 101 while being close to a TDD small cell access node 103. In short, the PCell can be a serving cell that provides macro coverage, broadcasts system information and provides control plane connectivity, where the SCell(s) can be serving cells that provides small cell coverage and user plane connectivity for user data transmission and reception.

Such a configuration also enables handover on PCell level to be minimized as the UE 104, 105 and 106 moves from one TDD small cell access node 103 to another TDD small cell access node 103. Compared to a FDD macro cell access node 101, a TDD small cell access node 103 can provide better link quality as the close proximity of the UE 104, 105, 106 to the TDD small cell access node 103 results in a low coupling loss.

According the first deployment scenario 110, the UE 104 initially detects and camps on a FDD macro cell access node 101. The UE 104 establishes RRC connection with the advanced mobile network through the FDD macro cell access node 101 on FDD carriers. Due to mobility, the UE 104 then enters small cell coverage serviced by the TDD small cell access node 103. Via dedicated RRC signaling through FDD macro cell access node 101, the UE 104 is configured to perform TDD small cell measurement and to add a second TDD carrier component serviced by the TDD small cell access node 103 as assisted aggregated carrier for additional data reception and transmission. The second TDD carrier component is added in addition to a primary FDD carrier component as anchor component that is serviced by the FDD macro cell access node 101.

The primary carrier component (or PCell) serviced by the FDD macro cell access node 101 is LTE FDD where the secondary carrier component (SCell) serviced by the TDD small cell access node 103 is LTE-TDD. There may be up to 5 SCells in the 1st deployment scenario 110. At the UE position in scenario 110, the FDD macro cell access node 101 may configure the UE 104 to have a TM with one or two TBs on PCell and with one TB on SCell. At the UE position in scenario 111, the FDD macro cell access node 101 may configure the UE 104 to have a TM with one TB on the PCell and one or two TBs on the SCell.

According to alternative embodiments, the advanced wireless communication system 100 enables FDD-TDD carrier aggregation where an FDD carrier is the PCell and a flexible TDD carrier(s) is the SCell, as illustrated by a second deployment scenario 112.

According the second deployment scenario 112, the UE 105 detects and camps on FDD macro cell base station 101. The UE 105 establishes an RRC connection with the advanced mobile network through the FDD macro cell access node 101 on an FDD carrier. Via dedicated RRC signaling through the FDD macro cell access node 101, the UE 105 is configured to perform small cell measurement and to add a second TDD carrier component serviced by the TDD small cell access node 103 as assisted aggregated carrier for additional data reception and transmission. The second TDD carrier component is in addition to a primary FDD carrier component as anchor component carrier that is serviced by the macro cell access node 101. The primary carrier component serviced by the macro cell access node 101 is LTE FDD where the secondary carrier component serviced by the TDD small cell access node 103 is flexible LTE-TDD.

The traffic within the TDD small cell access node 103 may change due to a new UE entering the TDD small cell access node 103 or an existing UE departing from the TDD small cell access node 103. As an illustrative example, and with reference to FIG. 1, the UE 106 can handover from macro cell access node 101 to the TDD small cell access node 103 due to UE mobility 122 and/or UE 106 can handover from TDD pico-cell 103 to FDD macro cell access node 101 due to mobility 123. As the cell traffic change, the TDD small cell access node 103 may flexibly change cell UL-DL configuration to optimise user experienced throughput for each active UE in its coverage. As discussed with reference to the first deployment scenario 110, depending on a position of the UE 105, a resulting channel quality difference between PCell and SCell lead to the SCell being configured with a TM with a higher number of TBs than of the PCell.

Figure 2A:
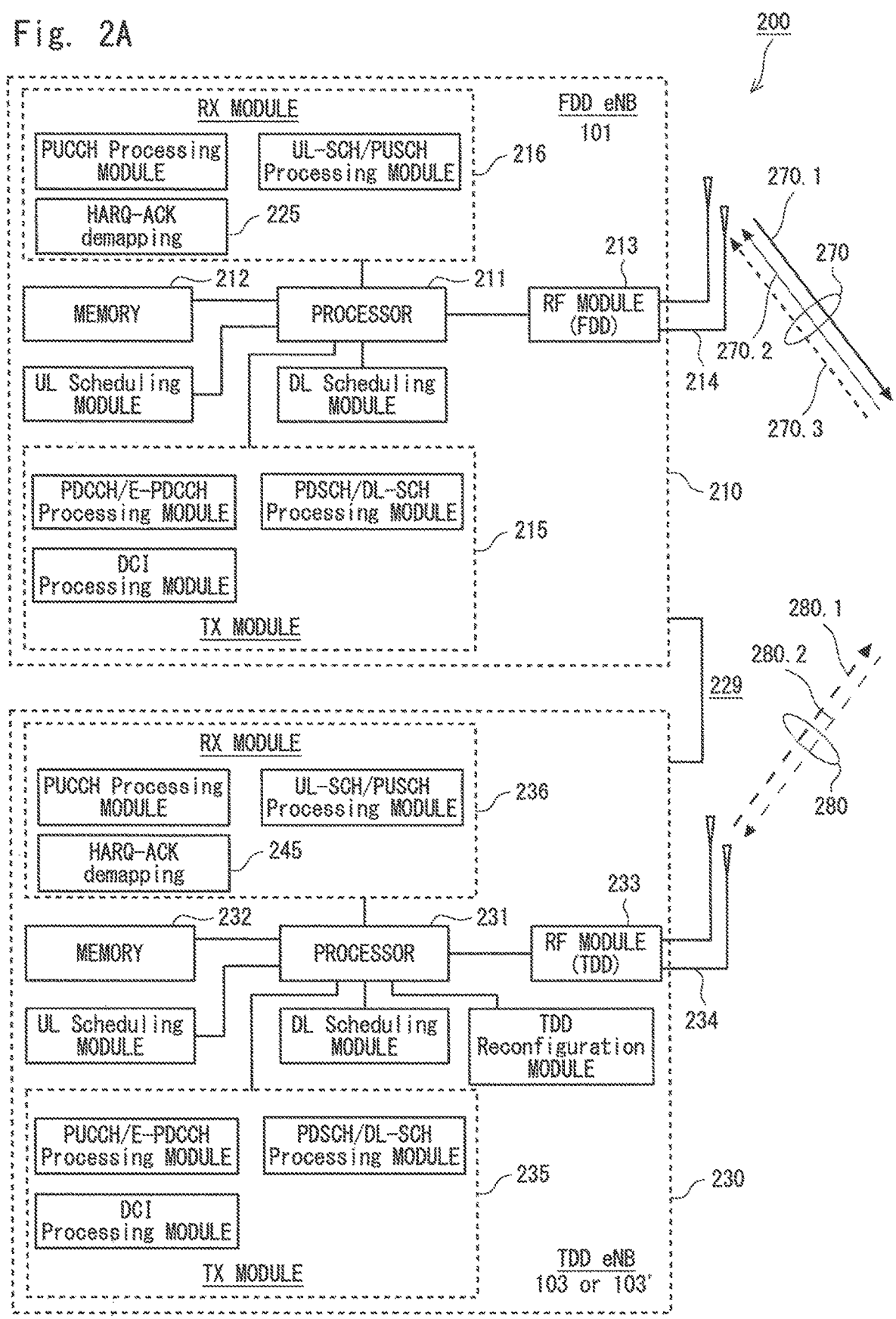
FIG. 2A illustrates a simplified block diagram of a part of an advanced wireless communication system, according to another embodiment of the present invention.
Figure 2B:
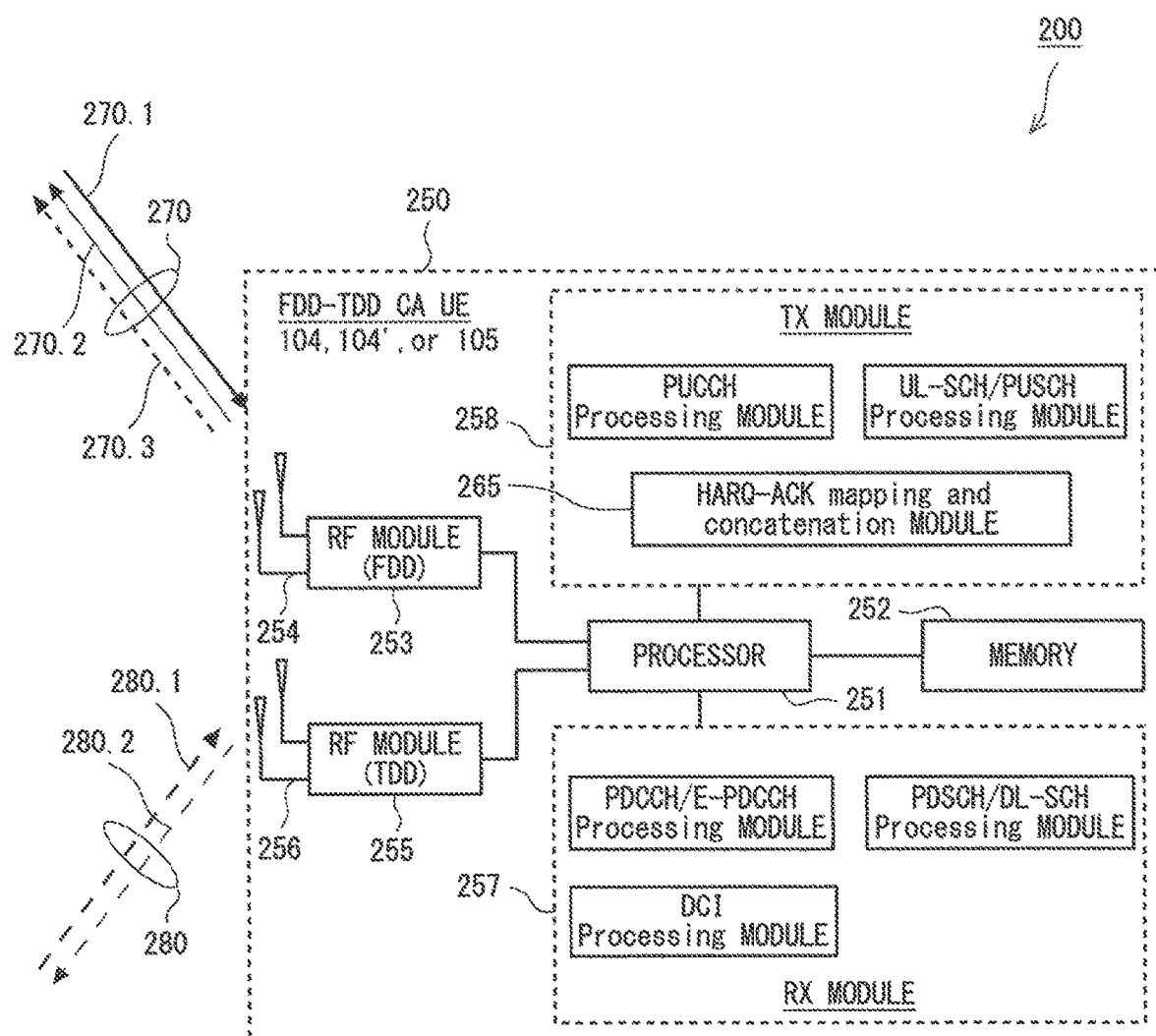
FIG. 2B illustrates a simplified block diagram of the remaining part of the advanced wireless communication system, according to the another embodiment of the present invention.

FIGS. 2A and 2B illustrate a simplified block diagram of an advanced wireless communication system 200, according to an embodiment of the present invention. The advanced wireless communication system 200 includes an FDD advanced base station 210, representing a FDD access node such as the FDD macro cell access node 101 of FIG. 1, and a TDD advanced base station 230, representing a TDD access node such as the TDD small cell access node 103 of FIG. 1. The advanced wireless communication system 200 further includes a simplified block diagram of an advanced UE 250, representing UE capable of performing inter system FDD-TDD CA, such as the UE 104 or 105 of FIG. 1.

The advanced FDD base station 210 includes a processor 211, a memory 212 containing program instructions and databases, a FDD radio frequency (RF) module 213 having transmitter operating on DL carrier component and a receiver operating on UL carrier component, an antenna array 214 for transmitting cellular radio frequency signal to UEs in the cell and receiving radio frequency signal from UEs in the cell, and a TX module 215 for performing DL transport channels and physical channels coding and signal processing as well as control signal and reference signal processing. The advanced FDD base station 210 further includes a RX module 216 for performing UL channels reception, signal processing, and channel decoding. The RX module further includes HARQ-ACK de-mapping module 225 for decoding and interpreting received HARQ-ACK symbols on PUCCH, as discussed in further detail below.

The advanced TDD base station 230 includes a processor 231, a memory 232 containing program instructions and databases, a TDD radio frequency (RF) module 233 having transmitter and receiver operating on the same carrier component, an antenna array 234 for transmitting and receiving cellular radio frequency signal to UEs and from UEs in the cell, a TX module 235 for performing DL transport channels and physical channels coding and signal processing as well as control signal and reference signal processing, and an RX module 236 for performing UL channels reception, signal processing, and channel decoding. The RX module further includes HARQ-ACK de-mapping module 225 for decoding and interpreting received HARQ-ACK symbols on PUSCH, as discussed further below.

The advanced UE 250 includes a processor 251, a memory 252 containing program instructions and databases, a FDD radio frequency (RF) module 253 having transmitter operating on UL carrier component and a receiver operating on DL carrier component, antennas 254 for transmitting cellular radio frequency signal to a servicing FDD base station and receiving radio frequency signal from the servicing FDD base station, a TDD radio frequency (RF) module 255 having transmitter and receiver operating on the same carrier component, antennas 256 for transmitting and receiving cellular radio frequency signal to and from the servicing TDD base station, and a RX module 257 for performing DL transport channels and physical channels reception, signal processing and decoding. The RX module 257 further includes a TX module 258 for performing UL channels encoding and transmissions, the TX module including a HARQ-ACK mapping and concatenation module 265 for encoding transmitted HARQ-ACK symbols, as discussed in further details below.

A first aspect of the present invention relates to a method of feeding back HARQ-ACK for a FDD-TDD CA system when FDD PCell is configured with a Transmission Mode (TM) that supports one transport block or two transport block while SCell is independently configured with TM that supports one transport block or two transport blocks.

As discussed above, in LTE Rel. 10-11 CA system, PCell is always the serving cell with best channel quality, and thus the PCell is always configured with a TM support the same or a higher number of TBs than the SCell, e.g. 2 TBs on SCell and 1 TB on PCell. Thus, legacy LTE Rel'10 and 11 CA consists of 3 configurations, A=2, A=3 and A=4, as shown in table 1a below.

TABLE 1a

| A | HARQ-ACK(0) | HARQ-ACK(1) | HARQ-ACK(2) | HARQ-ACK(3) |
|---|---|---|---|---|
| | | HARQ-ACK(j) | | |
| 2 | TB1 Primary Cell | TB1 Secondary Cell | NA | NA |
| 3 | TB1 Serving Cell 1 | TB2 Serving Cell 1 | TB1 Serving Cell 2 | NA |
| 4 | TB1 Primary Cell | TB2 Primary Cell | TB1 Secondary Cell | TB2 Secondary Cell |

With reference to Table 1a, for the case A=3, there are two HARQ-ACK bits for two TBs on PCell and one HARQ-ACK bit for one TB one SCell. Accordingly, no HARQ-ACK configuration exists for a PCell having one TB and an SCell having two TBs.

However, as the PCell can be deployed as a macro cell providing macro coverage, broadcasting system information, performing mobility management and providing control plane connectivity, as discussed above, it is desirable to enable the Scell to have more TBs than the Pcell. As such, a new HARQ mapping table is provided in table 1b, including an entry A=3* thus providing 4 possible configurations, as shown below.

TABLE 1b

| A | HARQ-ACK(0) | HARQ-ACK(1) | HARQ-ACK(2) | HARQ-ACK(3) |
|---|---|---|---|---|
| | | HARQ-ACK(j) | | |
| 2 | TB1 Primary Cell | TB1 Secondary Cell | NA | NA |
| 3 | TB1 Serving Cell 1 | TB2 Serving Cell 1 | TB1 Serving Cell 2 | NA |
| 3* | TB1 Serving Cell 1 | TB1 Serving Cell 2 | TB2 Serving Cell 2 | NA |
| 4 | TB1 Primary Cell | TB2 Primary Cell | TB1 Secondary Cell | TB2 Secondary Cell |

For the transmission of format 1b HARQ-ACK channel selection, Table 2 illustrates transmission of format 1b HARQ-ACK channel selection for A=2, Table 3 illustrates transmission of format 1b HARQ-ACK channel selection for A=3, and Table 4 illustrates transmission of format 1b HARQ-ACK channel selection for A=4.

TABLE 2

| HARQ-ACK(0) | HARQ-ACK(1) | $n_{PUCCH}^{(1)}$ | b(0)b(1) |
|---|---|---|---|
| ACK | ACK | $n_{PUCCH, 1}^{(1)}$ | 1, 1 |
| ACK | NACK/DTX | $n_{PUCCH, 0}^{(1)}$ | 1, 1 |
| NACK/DTX | ACK | $n_{PUCCH, 1}^{(1)}$ | 0, 0 |
| NACK | NACK/DTX | $n_{PUCCH, 0}^{(1)}$ | 0, 0 |
| DTX | NACK/DTX | | No Transmission |

TABLE 3

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH, 1}^{(1)}$ | 1, 1 |
| ACK | NACK/DTX | ACK | $n_{PUCCH, 1}^{(1)}$ | 1, 0 |
| NACK/DTX | ACK | ACK | $n_{PUCCH, 1}^{(1)}$ | 0, 1 |
| NACK/DTX | NACK/DTX | ACK | $n_{PUCCH, 2}^{(1)}$ | 1, 1 |
| ACK | ACK | NACK/DTX | $n_{PUCCH, 0}^{(1)}$ | 1, 1 |
| ACK | NACK/DTX | NACK/DTX | $n_{PUCCH, 0}^{(1)}$ | 1, 0 |
| NACK/DTX | ACK | NACK/DTX | $n_{PUCCH, 0}^{(1)}$ | 0, 1 |
| NACK/DTX | NACK/DTX | NACK | $n_{PUCCH, 2}^{(1)}$ | 0, 0 |
| NACK | NACK/DTX | DTX | $n_{PUCCH, 0}^{(1)}$ | 0, 0 |
| NACK/DTX | NACK | DTX | $n_{PUCCH, 0}^{(1)}$ | 0, 0 |
| DTX | DTX | DTX | | No Transmission |

TABLE 4

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH, 1}^{(1)}$ | 1, 1 |
| ACK | NACK/DTX | ACK | ACK | $n_{PUCCH, 2}^{(1)}$ | 0, 1 |
| NACK/DTX | ACK | ACK | ACK | $n_{PUCCH, 1}^{(1)}$ | 0, 1 |
| NACK/DTX | NACK/DTX | ACK | ACK | $n_{PUCCH, 3}^{(1)}$ | 1, 1 |
| ACK | ACK | ACK | NACK/DTX | $n_{PUCCH, 1}^{(1)}$ | 1, 0 |
| ACK | NACK/DTX | ACK | NACK/DTX | $n_{PUCCH, 2}^{(1)}$ | 0, 0 |
| NACK/DTX | ACK | ACK | NACK/DTX | $n_{PUCCH, 1}^{(1)}$ | 0, 0 |
| NACK/DTX | NACK/DTX | ACK | NACK/DTX | $n_{PUCCH, 3}^{(1)}$ | 1, 0 |
| ACK | ACK | NACK/DTX | ACK | $n_{PUCCH, 2}^{(1)}$ | 1, 1 |
| ACK | NACK/DTX | NACK/DTX | ACK | $n_{PUCCH, 2}^{(1)}$ | 1, 0 |
| NACK/DTX | ACK | NACK/DTX | ACK | $n_{PUCCH, 3}^{(1)}$ | 0, 1 |
| NACK/DTX | NACK/DTX | NACK/DTX | ACK | $n_{PUCCH, 3}^{(1)}$ | 0, 0 |
| ACK | ACK | NACK/DTX | NACK/DTX | $n_{PUCCH, 0}^{(1)}$ | 1, 1 |
| ACK | NACK/DTX | NACK/DTX | NACK/DTX | $n_{PUCCH, 0}^{(1)}$ | 1, 0 |
| NACK/DTX | ACK | NACK/DTX | NACK/DTX | $n_{PUCCH, 0}^{(1)}$ | 0, 1 |
| NACK/DTX | NACK | NACK/DTX | NACK/DTX | $n_{PUCCH, 0}^{(1)}$ | 0, 0 |
| NACK | NACK/DTX | NACK/DTX | NACK/DTX | $n_{PUCCH, 0}^{(1)}$ | 0, 0 |
| DTX | DTX | NACK/DTX | NACK/DTX | | No Transmission |

The PUCCH resource is specified as follows if PDCCH/EPDCCH is used:

For A=3, $n_{PUCCH,0}^{(1)}=n_{CCE}+N_{PUCCH}^{(1)}$, $n_{PUCCH,1}^{(1)}=n_{CCE}+N_{PUCCH}^{(1)}+1$, and $n_{PUCCH,2}^{(1)}$ is determined by TPC field in DCI format of the corresponding PDCCH/EPDCCH and higher layer configuration. For A=3*, $n_{PUCCH,0}^{(1)}=n_{CCE}+N_{PUCCH}^{(1)}$, but both $n_{PUCCH,1}^{(1)}$ and $n_{PUCCH,2}^{(1)}$ are determined by TPC field in DCI format of the corresponding PDCCH/EPDCCH and higher layer configuration.

When PDCCH/EPDCCH is used, the index of PUCCH can be determined accordingly based on 3GPP LTE Rel. 11 specification. For convenience, in the following paragraphs, PDCCH is assumed in some examples, although the use of EPDCCH in FDD-TDD CA system is not precluded.

A second aspect of the invention includes a method for concatenating PDSCH HARQ-ACK bits in FDD-TDD CA system when the PCell is an FDD serving cell.

For UEs supporting carrier aggregation of at most 2 serving cells including an FDD PCell and a TDD SCell, PUCCH format 1b, defined in 3GPP LTE, is used with channel selection for transmission of HARQ-ACK when configured with more than one serving cell, as discussed in further detail below.

For UEs supporting aggregation of more than 2 serving cells including an FDD PCell and at least one TDD SCell, the UE is configured by higher layers to use either PUCCH format 1b with channel selection or PUCCH format 3, also defined in 3GPP LTE, for transmission of HARQ-ACK when configured with more than one serving cell with FDD PCell and at least one TDD SCell, as discussed in further detail below.

Finally, when FDD is configured as PCell and at least one SCell is TDD serving cell, the procedures of HARQ-ACK feedback on PUCCH for more than one configured serving cell are either based on PUCCH format 1a/1b, PUCCH format 1b with channel selection, or PUCCH format 3, as discussed in further detail below.

PUCCH Format 1b with Channel Selection HARQ Procedure

For FDD-TDD CA systems with an FDD PCell and only one TDD SCell, PUCCH format 1b with channel selection can be used to feedback HARQ-ACK. In the following paragraphs, if not stated otherwise, the FDD PCell is assumed to be configured with a TM that supports up to two TBs and the TDD SCell is configured with a TM that supports only one TB.

As mentioned above, a UE may fail to detect a reconfiguration message/signaling, and as a result the UE and eNB may have different understandings of a transmission direction of a certain subframe, even when a fall back mechanism is used. With specific reference to FIG. 3, the UE may fail to decode the reconfiguration signaling for persistent windows #n+1 in TDD SCell-1 and thus incorrectly apply TDD configuration #1 in frame #n+1. In order to alleviate or at least ameliorate this problem, two methods of concatenating HARQ-ACK bits from an FDD PCell and a TDD SCell are provided.

Option1: HARQ-ACK is Generated for UL and DL Subframe on TDD Serving Cell

The number of bits used for HARQ-ACK signaling is determined based on a number of serving cells and a transmission mode of each of the serving cells. When a subframe in a TDD serving cell is considered by the UE to be a UL subframe, the corresponding HARQ-ACK bit(s) are assigned as DTX or NACK/DTX. Transmission of the HARQ-ACK signaling is then performed using PUCCH format 1b with channel selection for A=2, A=3 or A=4 according to Table 2, Table 3 or Table 4, respectively.

The mapping of transport block and serving cell to HARQ-ACK (j) for PUCCH format 1b with channel selection is specified in Table 1, above.

For instance, as illustrated in FIG. 3 (300.1), HARQ-ACK (0) and HARQ-ACK (1) are associated with DL subframe #9 (302) on the FDD serving cell, and HARQ-ACK (2) is associated with DL subframe #9 (309) on the TDD serving cell. If there is no PDSCH/PDCCH/EPDCCH detected in the corresponding DL subframe, HARQ-ACK (j) will be assigned with the value of DTX or NACK/DTX. According to Table 3, one QPSK symbol "11" is transmitted on $n_{PUCCH,0}^{(1)}$ when HARQ-ACK (0), HARQ-ACK (1), HARQ-ACK (2) are ACK, ACK and NACK/DTX, respectively. At the receiver side, the eNB will try to detect QPSK signal on each PUCCH resource and detect "11" on $n_{PUCCH,0}^{(1)}$, and accordingly can determine, based on Table 3, that the TBs on the FDD PCell were correctly received by the UE, while the one TB on TDD SCell-1 was not correctly decoded by the UE.

As further illustrated in FIG. 3, HARQ-ACK(0) and HARQ-ACK(1) are later associated with DL subframe #2 (303) on the FDD serving cell, and HARQ-ACK(2) is associated with subframe #2 (310) in the TDD serving cell. Since subframe #2 (310) in the TDD serving cell is considered as a UL subframe by the UE, HARQ-ACK(2) is assigned with DTX or NACK/DTX. According to Table 3, one QPSK symbol "11" is transmitted on $n_{PUCCH,0}^{(1)}$ when HARQ-ACK(0), HARQ-ACK(1), HARQ-ACK(2) are ACK, ACK and NACK/DTX, respectively. At the receiving side, the eNB will try to detect the corresponding QPSK signal on each PUCCH resource and will detect "11" on $n_{PUCCH,0}^{(1)}$. Based on Table 3 the eNB is able to interpret that the two TBs transmitted on FDD PCell were correctly received by UE. Furthermore, since the eNB knows that there was no DL transmission given in subframe #2 (310) of the TDD SCell-1, the HARQ-ACK bit with value of "NACK/DTX" can be ignored.

As yet further illustrated in FIG. 3, HARQ-ACK(0) and HARQ-ACK(1) are later again associated with DL subframe #3 (305) on FDD serving cell and HARQ-ACK(2) is associated with subframe #3 (311) in TDD serving cell. If the UE misses the new system information (i.e. UL-DL configuration change from #1 to #5) in persistent windows-n+1, for example because a fast reconfiguration signaled was not detected by UE if TDD SCell is configured with eIMTA, the eNB and the UE will have a different understanding in terms of the transmission direction on subframe #3 (311), subframe #7 (312) and subframe #8 (317).

Consequently, subframe #3 (311) in the TDD serving cell is considered as an UL subframe by the UE and HARQ-ACK (2) is assigned with DTX or NACK/DTX. According to Table 3, one QPSK symbol "11" is transmitted on $n_{PUCCH,0}^{(1)}$ when HARQ-ACK(0), HARQ-ACK(1), HARQ-ACK(2) are ACK, ACK and NACK/DTX, respectively. If the eNB has scheduled a DL transmission on subframe #3 (311) on TDD serving cell, by receiving HARQ-ACK(2)=NACK/DTX from the UE, the eNB can determine that the UE has missed or failed to decode the PDSCH/PDCCH/EPDCCH transmission in the subframe, and a retransmission can be scheduled in a later DL subframe, or dropped if a retransmission time reaches a maximum threshold.

Similarly, when both the FDD PCell and the TDD SCell are configured with TM which supports up to two transport blocks, Table 4 is adopted for HARQ-ACK feedback.

Option2: Fall Back Method

If the UE detects a DL transmission on an FDD PCell only, then a fall-back method, i.e. PUCCH format 1a/1b, can be used to feedback HARQ-ACK for the FDD PCell. This may occur for example either because subframes in TDD SCells are used as UL subframes, or no PDSCH/PDCCH/EPDCCH is detected on a DL subframe of the TDD SCell.

As specified in 3GPP LTE Rel. 8-11, whether PUCCH format 1a/1b should be used depends on the number of HARQ-ACK bits required. If one subframe on the TDD serving cell is determined to be a UL subframe, then no HARQ-ACK bit shall be generated for it. As such, the HARQ-ACK for the FDD PCell can be fed back by using PUCCH format 1a/1b as if the UE had been configured with only one FDD serving cell.

The eNB and the UE may then have different understanding in terms of the feedback scheme adopted, but the eNB and UE will have a common interpretation of the HARQ-ACK bit for PDSCH/PDCCH/EPDCCH transmission on the FDD PCell.

For instance, as illustrated in FIG. 3 (300.1), HARQ-ACK (0) and HARQ-ACK(1) are associated with DL subframe #9 (302) on the FDD serving cell. If there is no PDSCH/PDCCH/EPDCCH detected in DL subframe #9 (309) on TDD SCell-1, HARQ-ACK(2) will not be generated and PUCCH format 1b can be used by the UE as a fall back method.

At the UE side, PUCCH format 1b is adopted for HARQ-ACK feedback, and one QPSK symbol "11" is transmitted on $n_{PUCCH,0}^{(1)} = n_{CCE} + N_{PUCCH}^{(1)}$. If PUCCH transmission diversity is configured, then one QPSK symbol "11" is also transmitted on $n_{PUCCH,1}^{(1)} = n_{CCE} + N_{PUCCH}^{(1)} + 1$ of another antenna port.

At the eNB side, PUCCH format 1b with channel selection is assumed as being used by the UE. One QPSK symbol "11" is thus detected on $n_{PUCCH,0}^{(1)} = n_{CCE} + N_{PUCCH}^{(1)}$, and according to Table 3, the eNB can determine that HARQ-ACK (0), HARQ-ACK (1), HARQ-ACK (2) are ACK, ACK, and NACK/DTX, respectively. Accordingly, the eNB can determine that the two transport blocks transmitted on subframe #2 (303) on the FDD PCell were correctly received by the UE, while the transport block on TDD SCell-1 was missed or not successfully decoded by the UE.

If PUCCH transmission diversity is configured, the eNB may detect QPSK symbols on other PUCCH channels. In particular, one QPSK symbol "11" can also be detected on $n_{PUCCH,1}^{(1)} = n_{CCE} + N_{PUCCH}^{(1)} + 1$, and according to Table 3, the eNB can decode HARQ-ACK(0), HARQ-ACK(1), HARQ-ACK(2) to ACK, ACK, and ACK, respectively. Although the eNB may find different HARQ-ACK combinations on different PUCCH resources, the HARQ-ACK for the FDD PCell is always the same. Since the value of HARQ-ACK (2) can be conflicting, the eNB can determine that the transport block of TDD SCell-1 is missed.

As further illustrated in FIG. 3, HARQ-ACK (0) and HARQ-ACK (1) are later associated with DL subframe #2 (303) on the FDD PCell. Since subframe #2 (310) in the TDD serving cell is considered as an UL subframe by the UE, no related HARQ-ACK will be generated. Since subframe #2 (310) in the TDD serving cell is used as a fixed UL subframe, the UE and the eNB should not have any ambiguity in terms of the transmission direction on this subframe, and thus share the same view that PUCCH format 1b is used as the HARQ-ACK feedback scheme. Assuming two transport blocks on the FDD PCell are correctly decoded, then QPSK symbol "11" is transmitted on $n_{PUCCH,0}^{(1)} = n_{CCE} + N_{PUCCH}^{(1)}$. If PUCCH transmission diversity is configured one QPSK symbol "11" is also transmitted on $n_{PUCCH,1}^{(1)} = n_{CCE} + N_{PUCCH}^{(1)} + 1$ of another antenna port.

At the eNB side, one QPSK symbol "11" is detected on $n_{PUCCH,0}^{(1)} = n_{CCE} + N_{PUCCH}^{(1)}$, and one QPSK symbol "11" is detected on $n_{PUCCH,1}^{(1)} = n_{CCE} + N_{PUCCH}^{(1)} + 1$ if PUCCH transmission diversity is configured. Based on the detected QPSK symbol(s), the eNB can determine that two transport blocks on the FDD PCell were correctly decoded at the UE side.

As mentioned earlier, in case of a reconfiguration error, the eNB and the UE can have different understandings in terms of the transmission direction of a subframe. For example, as illustrated in FIG. 3, on subframe #3 (311), subframe #7 (312) and subframe #8 (317), the UE did not correctly receive the new system information (i.e. TDD configuration #5) for persistent windows-2. This can be because a fast reconfiguration signaling is not detected by the UE if the TDD SCell is configured with eIMTA.

HARQ-ACK(0) and HARQ-ACK(1) are associated with DL subframe #3 (305) on the FDD serving cell. Since subframe #3 (311) in the TDD serving cell is considered as a UL subframe by UE, no related HARQ-ACK will be generated. In such case, the UE uses PUCCH format 1b in feeding back the HARQ-ACK for DL transmission on the PCell and the eNB interprets the HARQ-ACK feedback assuming PUCCH format 1b with channel selection is used.

At the UE side, PUCCH format 1b is adopted for HARQ-ACK feedback, and one QPSK symbol "11" is transmitted on $n_{PUCCH,0}^{(1)} = n_{CCE} + N_{PUCCH}^{(1)}$. If PUCCH transmission diversity is configured, and then one QPSK symbol "11" is also transmitted on $n_{PUCCH,1}^{(1)} = n_{CCE} + N_{PUCCH}^{(1)} + 1$ of another antenna port.

At the eNB side, PUCCH format 1b with channel selection is assumed to be used by UE. One QPSK symbol "11" is detected on $n_{PUCCH,0}^{(1)} = n_{CCE} + N_{PUCCH}^{(1)}$, and, according to Table 4, the eNB determines that HARQ-ACK(0), HARQ-ACK(1), HARQ-ACK(2) are ACK, ACK, and NACK/DTX, respectively. In another words, the eNB can determine that two transport block on subframe #2 (305) of the FDD PCell were correctly received by the UE, while the transport block on TDD SCell-1 was missed or not successfully decoded by the UE.

If PUCCH transmission diversity is configured, the eNB may continue to detect QPSK symbols on other PUCCH channels. For example, QPSK symbol "11" may also detected on $n_{PUCCH,1}^{(1)} = n_{CCE} + N_{PUCCH}^{(1)} + 1$, and according to Table 4, the eNB can determine that HARQ-ACK (0), HARQ-ACK(1), and HARQ-ACK(2) are ACK, ACK, and ACK, respectively. Although the eNB may find different HARQ-ACK combinations on different PUCCH resources, the HARQ-ACK for the FDD PCell is always the same. When the value of HARQ-ACK(2) is conflicting, the eNB can determined that the transport block of the TDD SCell-1 is missed.

From the above example, it is evident that the eNB is able to receiving and correctly interpreting the HARQ-ACK bits for DL transmission on FDD PCell, even in the event of a configuration error at the UE.

PUCCH Format 3 HARQ Procedure

For PDSCH transmission on an FDD PCell only, indicated, for example, by the detection of a corresponding PDCCH/EPDCCH, a PDCCH/EPDCCH indicating downlink SPS release on FDD PCell, or PDSCH transmission on the FDD PCell where there is not a corresponding PDCCH/EPDCCH, PUCCH format 1a/1b is used to transmit the HARQ-ACK message, although PUCCH format 3 is configured.

If cross-carrier scheduling is configured and the subframe on the TDD SCell is considered to be a UL subframe, the UE may or may not try to blind decode PDCCH/EPDCCH of TDD SCell on PCell.

For a PDSCH transmission on the secondary cell indicated by the detection of a corresponding PDCCH/EPDCCH, the UE shall use PUCCH format 3 and PUCCH resource $n_{PUCCH}^{(3)}$ as indicated by a TPC field in the DCI format of the corresponding PDCCH/EPDCCH.

If PUCCH format 3 is used, i.e. the UE does not fall back to PUCCH format 1a/1b, HARQ-ACK bit(s) shall be generated for the corresponding subframe on each serving cell, regardless of whether UE treats the subframe as DL/Special subframe or UL subframe.

As illustrated in FIG. 3 (300.2), assuming TDD SCell 2 is configured with TM which supports two transport blocks, then HARQ-ACK(0) and HARQ-ACK(1) are generated for DL subframe #9 (302) on FDD PCell, HARQ-ACK(2) is generated for DL subframe #9 (309) on TDD SCell-1 and HARQ-ACK(3) and HARQ-ACK(4) is generated for DL subframe #9 (313) on TDD SCell-2. At the eNB side, as the eNB knows the TM of each serving cell and thus the HARQ-ACK for each DL PDSCH/PDCCH/EPDCCH, transmission can be decoded without ambiguity.

As further illustrated in FIG. 3, a DL subframe is allocated on the PCell and UL subframes on the SCells, since the UE considers subframe #2 (310) on TDD SCell-1 and subframe #2 (314) on TDD SCell-2 as UL subframes. Accordingly, the UE only detects PDSCH/PDCCH/EPDCCH transmission on DL subframe #3 (303) on the FDD PCell. Thus PUCCH format 1b is adopted for feeding back 2 HARQ-ACK bits for 2 TBs on the PCell. At the eNB side, since a PDSCH/PDCCH/EPDCCH were not sent on subframe #2 (310) of TDD SCell-1 or subframe #2 (314) on TDD SCell-2, PUCCH format 1b is expected, and HARQ-ACK (0) and HARQ-ACK (1) can be decoded without ambiguity.

Further illustrated in FIG. 3, the UE may miss detection of an UL-DL configuration change, since the UE may miss UL-DL reconfiguration configuration signaling. As such, the UE may consider subframe #3 (311) as a UL subframe, and the PDSCH/PDCCH/EPDCCH sent by the eNB will not be received by the UE on this DL subframe. If HARQ-ACK bit(s) are not generated for a subframe which is considered by UE as UL subframe, the eNB may have a problem in understanding the relationship between the HARQ-ACK and the corresponding PDCCH/PDCCH/EPDCCH. For instance, if HARQ-ACK(0) and HARQ-ACK(1) are generated for FDD PCell and HARQ-ACK(2) and HARQ-ACK (3) are generated for TDD SCell-2, the eNB may think that HARQ-ACK(2) is the HARQ-ACK feedback for DL transmission on DL subframe #3 (311) on TDD SCell-1 and HARQ-ACK(3) is for DL transmission on DL subframe #3 (315) on TDD SCell-2. As a result, DL transmission on DL subframe #3 (311) on TDD SCell-1 will not be retransmitted and DL transmission on DL subframe #3 (315) on TDD SCell-2 will be retransmitted since eNB is expecting two HARQ-ACK bits when a TM supporting 2 TBs is configured.

In order to resolve this ambiguity, the UE can generate HARQ-ACK bit(s) for UL subframes. This can even be used for fixed UL subframes, such as subframe #2 in all TDD frames. In such case, the related HARQ-ACK(j) is assigned with "NACK". For instance, HARQ-ACK(0) and HARQ-ACK(1) are generated for DL subframe #3 (305) on FDD PCell, HARQ-ACK(2) is generated for subframe #3 (311) on TDD SCell with the value of "NACK" since the UE thinks it is used for UL transmission, and HARQ-ACK(3) and HARQ-ACK(4) are generated for DL subframe #3 (315) on TDD SCell-2. At the eNB side, a 5 bits HARQ-ACK message is expected based on the configured TM on each serving cell, and thus the eNB should not have any problem in linking the received 5 bits HARQ-ACK with PDSCH/PDCCH/EPDCCH transmission in each serving cell.

When PUSCH and PUCCH simultaneous transmission is not configured, and there is a UL transmission scheduled on a UL subframe with HARQ-ACK feedback, the HARQ-ACK bits are multiplexed with data and transmitted on the PUSCH. The procedures of HARQ-ACK feedback on PUSCH for more than one configured serving cell are detailed as follows:

The number of HARQ-ACK bits is determined based on the number of configured serving cells and the TMs configured in each serving cell. HARQ-ACK bit(s) are generated for all subframes across the serving cells, no matter whether the subframe is used as DL subframe or UL subframe on the TDD SCell(s). For fixed UL subframe such as subframe #2 on TDD serving cell, HARQ-ACK also can be generated to provide a uniform method.

As illustrated in FIG. 3 (300.2), assuming TDD SCell 2 is configured with TM which supports two transport blocks, then HARQ-ACK(0) and HARQ-ACK(1) are generated for DL subframe #9 (302) on FDD PCell, and HARQ-ACK(2) is generated for DL subframe #9 (309) on TDD SCell-1 and HARQ-ACK(3) and HARQ-ACK(4) is generated for DL subframe #9 (313) on TDD SCell-2. Based on the number of HARQ-ACK bits and CQI offset between data and HARQ-ACK, the number of symbols used for feeding back HARQ-ACK is determined and data symbol on predefined REs are overwritten by HARQ-ACK symbol. At the eNB side, the number of HARQ-ACK symbol is calculated by using the same method as at the UE side, and the HARQ-ACK symbol on predefined REs are used for HARQ-ACK decoding while the remaining data are used for UL data decoding. As a result, eNB and UE should have no ambiguity in terms of the relationship between the HARQ-ACK bits and PDSCH/PDCCH/EPDCCH transmission.

It is important for the UE and the eNB to have a common understanding in terms of the total number of HARQ-ACK bits provided from each serving cells. If ambiguity in the number of bits would occur, the eNB may have a problem in decoding the HARQ-ACK feedback when multiplexed with UL data.

As yet further illustrated in FIG. 3 (300.2), HARQ-ACK (0) and HARQ-ACK(1) are associated with DL subframe #2 (303) on the FDD serving cell. In such case, it is possible to feedback only HARQ-ACK(0) and HARQ-ACK(1) since the UE and the eNB should have the same understanding that subframe #2 is used as UL subframe. However, in order to provide a uniform method, HARQ-ACK(2) can be generated for subframe #2 (310) in TDD serving cell-1 and HARQ-ACK(3) and HARQ-ACK(4) can be generated for subframe #2 (314) in TDD serving cell-2. At the eNB side, since the eNB knows that the HARQ-ACK bit(s) are generated for all subframes across each serving cell, 5 HARQ-ACK bits are expected. The eNB and the UE have thus no ambiguity in terms of the relationship between the HARQ-ACK bits and PDSCH/PDCCH/EPDCCH transmission.

Again with reference to FIG. 3 (300.2), the UE and the eNB may have different understandings in terms of the transmission direction on subframe #3 (311) on TDD SCell-1. If no HARQ-ACK is generated for subframe #3 (311), then only 4 HARQ-ACK bits are fed back on UL subframe #7. As such, the UE will generate less HARQ-ACK bits than it should, namely 4 HARQ-ACK bits rather than 5 HARQ- ACK bits. As a result, the eNB may treat some data symbols as HARQ-ACK symbols, which will cause problems in decoding the PDSCH HARQ-ACK.

However, if HARQ-ACK bits are generated even for subframes which are considered as UL subframes, such as subframe #3 (311) which is considered as an UL subframe by the UE, such problems are avoided. For instance, HARQ-ACK (0) and HARQ-ACK (1) are in such case associated with DL subframe #2 (305) on FDD serving cell, HARQ-ACK(2) is associated with subframe #2 (311) in TDD SCell-1, and HARQ-ACK(3) and HARQ-ACK(4) are generated for subframe #2 (315) in TDD SCell-2. The eNB is then able to decode the PDSCH HARQ-ACK symbol.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The whole or part of the exemplary embodiments disclosed above can be described as, but not limited to, the following supplementary notes.

(Supplementary Note 1)
A signaling method for use in an advanced wireless communication network that supports a first duplex mode, a second duplex mode that is different to the first duplex mode, and carrier aggregation of the first duplex mode and the second duplex mode, the method including:
configuring a user equipment (UE) for data communication with the advanced wireless communication network through a first access node as a primary component carrier (PCell), on the first duplex mode and with a first transmission mode (TM) including one or more transport blocks (TBs); and
configuring the user equipment for data communication with the advanced wireless communication network through a second access node as a secondary component carrier (SCell), on the second duplex mode and with a second transmission mode (TM) including one or more transport blocks (TBs),
wherein the second TM associated with the second access node is configured independently of the first TM associated with the first access node.

(Supplementary Note 2)
The signaling method of Supplementary note 1, wherein the first duplex mode comprises frequency division duplex (FDD) and the second duplex mode comprises time division duplex (TDD).

(Supplementary Note 3)
The signaling method of Supplementary note 1, wherein the first access node is configured to operate at a first carrier frequency and the second access node is configured to operate at a second carrier frequency.

(Supplementary Note 4)
The signaling method of Supplementary note 1, wherein the user equipment is configured for data communication with the advanced wireless communication network through the second access node with the second TM having a greater number of TBs than of the first TM.

(Supplementary Note 5)
The signaling method of Supplementary note 1, wherein the user equipment is configured for data communication with the advanced wireless communication network through the first access node using one TB, and for data communication with the advanced wireless communication network through the second access node using two TBs.

(Supplementary Note 6)
The signaling method of Supplementary note 1, further comprising generating an acknowledgment message, the acknowledgment message comprising a plurality of acknowledgment message identifiers, wherein each of the one or more TBs of the first TM of the first access node and each of the one or more TBs of the second TM of the second access node is associated with one of the acknowledgment message identifiers.

(Supplementary Note 7)
The signaling method of Supplementary note 6, wherein the acknowledgment message identifiers comprise bits of the acknowledgment message.

(Supplementary Note 8)
The signaling method of Supplementary note 7, wherein the bits of the acknowledgment message comprise a first subset of bits for PCell TBs and a second subset of bits for SCell TBs.

(Supplementary Note 9)
The signaling method of Supplementary note 1, wherein the acknowledgment message identifiers comprise bits of a Hybrid Automatic Repeat reQuest (HARQ)-acknowledgment (ACK) message.

(Supplementary Note 10)
The signaling method of Supplementary note 9, wherein the bits (j=0-3) of the HARQ-ACK message are allocated according to the following table:

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary Cell | TB1 Secondary Cell | NA | NA |
| 3 | TB1 Serving Cell 1 | TB2 Serving Cell 1 | TB1 Serving Cell 2 | NA |
| 3* | TB1 Serving Cell 1 | TB1 Serving Cell 2 | TB2 Serving Cell 2 | NA |
| 4 | TB1 Primary Cell | TB2 Primary Cell | TB1 Secondary Cell | TB2 Secondary Cell |

(Supplementary Note 11)
The signaling method of Supplementary note 1, wherein the first access node comprises a macro base station having a macro coverage area, and the second access node comprises a small base station having a small coverage area within the macro coverage area, and wherein the UE is located in the small coverage area when configured for data communication through the first access node and the second access node.

(Supplementary Note 12)

The signaling method of Supplementary note 1, wherein the first access node is configured to provide macro coverage; broadcast of system information; handling of mobility management; and control plane connectivity, and the second access node is configured to provide small cell coverage and user plane connectivity for user data transmission and reception.

(Supplementary Note 13)

The signaling method of Supplementary note 1, wherein the second access node is configured to flexibly allocate resources to the UE according to a presence of other UEs in a coverage area of the second access node.

(Supplementary Note 14)

A signaling method for use in an advanced wireless communication network that supports a first duplex mode, a second duplex mode that is different to the first duplex mode, and carrier aggregation of the first duplex mode and the second duplex mode, the method including:

configuring a user equipment for data communication with the network through a first access node as a primary component carrier (PCell), on the first duplex mode and with a first transport mode (TM) including one or more transport blocks (TBs);

configuring the user equipment for data communication with the network through a second access node as a secondary component carrier (SCell), on the second duplex mode and with a second transport mode (TM) including one or more transport blocks (TBs); and allocating acknowledgment message identifiers to the one or more TBs independent of a transmission direction of any components of the one or more TBs.

(Supplementary Note 15)

The signaling method of Supplementary note 14, wherein the transmission direction comprises an uplink (UL) transmission direction and a downlink (DL) transmission direction.

(Supplementary Note 16)

The signaling method of Supplementary note 14, wherein the first duplex mode comprises frequency division duplex (FDD) and the second duplex mode comprises time division duplex (TDD).

(Supplementary Note 17)

The signaling method of Supplementary note 14, wherein the first access node is configured to operate at a first carrier frequency and the access node is configured to operate at a second carrier frequency.

(Supplementary Note 18)

The signaling method of Supplementary note 14, wherein the acknowledgment message identifiers comprise bits of an acknowledgment message.

(Supplementary Note 19)

The signaling method of Supplementary note 14, wherein the acknowledgment message identifiers comprise bits of a Hybrid Automatic Repeat reQuest (HARQ)-acknowledgment (ACK) message.

(Supplementary Note 20)

The signaling method of Supplementary note 19, wherein the HARQ-ACK message is multiplexed with data and transmitted on a physical uplink shared channel (PUSCH).

(Supplementary Note 21)

The signaling method of Supplementary note 14, wherein the acknowledgment message identifiers are fed back according to one of: physical uplink control channel (PUCCH) format 1a/1b, PUCCH format 1b with channel selection; and PUCCH format 3.

(Supplementary Note 22)

The signaling method of Supplementary note 14, further comprising:

determining that the user equipment is able to support carrier aggregation of no more than two (2) serving cells; and feeding back the generated acknowledgment message identifiers on PUCCH format 1a/1b resource.

(Supplementary Note 23)

The signaling method of Supplementary note 14, further comprising:

determining, for a subframe, that no downlink transmission (physical downlink control channel (PDCCH)/enhanced physical downlink control channel (EPDCCH)/ physical downlink shared channel (PDSCH)) occurs on the second access node for the DL subframe; and feeding back the acknowledgment message identifiers for the subframe of data according to 3rd generation partnership project (3GPP) long term evolution (LTE) PUCCH format 1a/1b.

(Supplementary Note 24)

The signaling method of Supplementary note 14, further comprising:

receiving a transmit power control (TPC) field data in a downlink control information (DCI) format of a PDCCH/ EPDCCH on the secondary access node; and feeding back the generated acknowledgment message identifiers on PUCCH resource of format 3 indicated by TPC field.

(Supplementary Note 25)

The signaling method of Supplementary note 14, wherein a predefined value is associated with acknowledgment message identifiers of uplink (UL) subframes.

(Supplementary Note 26)

The signaling method of Supplementary note 25, wherein a predefined value comprises negative acknowledgment (NACK).

This application is based upon and claims the benefit of priority from Australian provisional patent application No. 2013904975, filed on Dec. 19, 2013, the disclosure of which is incorporated herein in its entirety by reference.

REFERENCE SIGNS LIST 100, 200 ADVANCED WIRELESS COMMUNICATION SYSTEM
101 FDD MACRO ACCESS NODE
102 FDD SMALL CELL ACCESS NODE
103 TDD SMALL CELL ACCESS NODE
104, 105, 106, 250 UE
210 FDD ADVANCED BASE STATION
211, 231, 251 PROCESSOR
212, 232, 252 MEMORY
213, 253 FDD RF MODULE
214, 234 ANTENNA ARRAY
215, 235 TX MODULE
216, 236 RX MODULE
225 HARQ-ACK DE-MAPPING MODULE
230 TDD ADVANCED BASE STATION
232 TDD RF MODULE
254, 256 ANTENNA
255 TDD RF MODULE
257 RX MODULE
258 TX MODULE
265 HARQ-ACK MAPPING AND CONCATENATION MODULE

The invention claimed is:

1. A method implemented in a user equipment (UE) used in a wireless communications network supporting carrier aggregation (CA) of a primary cell and at least one secondary cell, the primary cell and the secondary cell supporting either frequency division duplex (FDD) or time division duplex (TDD), the method comprising:
   receiving downlink data in a downlink subframe on the primary cell with FDD at a first timing, wherein a subframe on the secondary cell with TDD at the first timing is a uplink subframe;
   generating a first hybrid automatic repeat request (HARQ)-acknowledgment (ACK) bit for the downlink subframe on the primary cell with FDD and generating a second HARQ-ACK bit for the uplink subframe on the secondary cell with TDD; and
   transmitting a first HARQ-ACK and a second HARQ-ACK on the primary cell with FDD at a second timing.

2. The method according to claim 1, wherein the first HARQ-ACK and the second HARQ-ACK are transmitted with physical uplink control channel (PUCCH) format 1b with channel selection.

3. The method according to claim 1, wherein the first HARQ-ACK and the second HARQ-ACK are transmitted with physical uplink control channel (PUCCH) format 3.

* * * * *